No. 870,185. PATENTED NOV. 5, 1907.
E. W. LINDGREN.
APPARATUS FOR AUTOMATIC SALE OF LIQUIDS.
APPLICATION FILED MAR. 26, 1906.
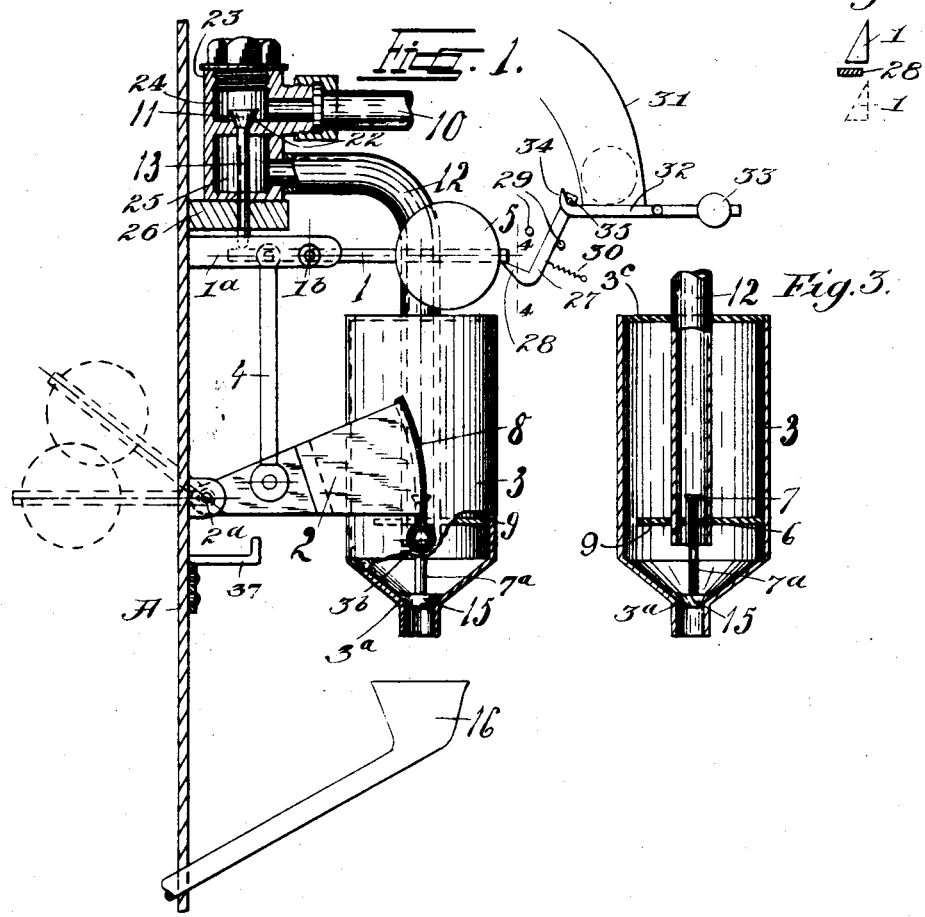
Witnesses:
C. H. Crawford
L. Waldman
Inventor:-
Erick Waldemar Lindgren
by B. Singer
Attorney

UNITED STATES PATENT OFFICE.

ERICK WALDEMAR LINDGREN, OF HAGALUND, NEAR STOCKHOLM, SWEDEN, ASSIGNOR TO AKTIEBOLAGET SVENSKA AUTOMAT FABRIKEN, OF STOCKHOLM, SWEDEN.

APPARATUS FOR AUTOMATIC SALE OF LIQUIDS.

No. 870,185.	Specification of Letters Patent.	Patented Nov. 5, 1907.

Application filed March 26, 1906. Serial No. 308,064.

*To all whom it may concern:*

Be it known that I, ERICK WALDEMAR LINDGREN, mechanician, a subject of the King of Sweden, residing at Hagalund, near Stockholm, Sweden, and whose post-office address is Järivagatan 6, Hagalund, near Stockholm, Sweden, have invented certain new and useful Improvements in Apparatus for the Automatic Sale of Liquids; and I do declare the following to be a full, clear, and exact description of the invention, such as will enable others skilled in the art to which it appertains to make and use the same, reference being had to the accompanying drawing.

This invention relates to apparatus for vending liquids which may or may not be coin-controlled and consists in the provision of a movable vessel, adapted to be operated in a straight line, together with a valved source of supply and means for effecting movement of said vessel and for controlling said source of supply. The invention also includes an improved valved outlet for said vessel which in the preferred form is operatively related to the inlet of said vessel.

The invention will be more fully described in connection with the accompanying drawings and will be more particularly pointed out and ascertained in and by the appended claims.

In the drawings: Figure 1 is a view partly in section and partly in elevation of a device embodying the main features of my invention. Fig. 2 is a plan view thereof showing the casing in section. Fig. 3 is a detail sectional view of the vessel showing the improved valved outlet therefor and a portion of the means of supplying the liquid. Fig. 4 is a sectional view on line 4—4 of Fig. 1.

Like character of reference designate similar parts throughout the different figures of the drawings.

As shown the casing is indicated by A and is preferably provided with a vending or discharge pipe 16. A container or vessel 3 is provided and is located in a manner to deliver to said pipe and is equipped at its lower or discharging end with a valve seat 3ª. Said vessel is adapted to be moved in a straight line which movement, in the present construction is in a vertical plane, and to this end supporting and guiding means are provided as follows. A supporting member 2 as shown is in the form of a lever which is pivotally mounted at 2ª to the casing A and is bifurcated to extend laterally of the vessel 3. The outer bifurcated ends of said lever 2 are preferably in the form of segments concentric with the center of the pivotal mounting 2ª. The ends of the lever 2 are designed to exert an upward pull on the vessel 3 which at all times coincides with the desired plane of movement of said vessel and to this end flexible connections are provided for said lever and vessel of the following construction. By means of the arched or segmental formation of the outer ends of the lever 2 and by reason of the flexible connection 8 the lifting movement of the lever 2 is always in the line of movement of the vessel 3, the outer end of the lever 2 being in line with the axis of movement of said vessel. In a construction such as that shown wherein the filling pipe engages the vessel to guide it in a straight line it is of great importance to reduce as much as possible the frictional engagement between the vessel and the filling pipe. If the pull of the lever 2 were exerted upon the vessel 3 in a direction angular to the line of movement thereof the guiding parts 3ª and 9 would wedge on the filling pipe and retard its upward movement. Straps 8 are secured to the outer segmental ends of the lever 2 and extend downwardly therefrom and are connected with trunnions 3ᵇ secured to the vessel 3. The vessel 3 may be guided by any suitable means to insure movement in a straight line but in the present construction a filling pipe 12 is provided which projects downwardly into the vessel and is engaged near its lower end by guides 9, mounted on the vessel 3, and at the upper end of said vessel 3 by the top wall 3ᶜ thereof. The filling pipe 12 is provided near its lower end with a valve seat 6 and in order to effect closure of the filling pipe 12 immediately after the prescribed quantity of liquid has been delivered to the vessel 3, there is provided two valves 7 and 15 which, as shown, are united by a valve stem 7ª, said valves 7 and 15 respectively coöperating with valve pipe and vessel seats 6 and 3ª respectively of the filling pipe 12 and the vessel 3, the latter being hereinafter termed the vessel valve seat. As shown the valve stem 7ª is of sufficient length to unseat the valve 7 when the vessel is in the position shown in Fig. 1 and the movement of the vessel is so proportioned that when it occupies a lowermost or delivering position wherein the valve 7 is seated, the spindle 7ª serves to unseat the valve 15. The mechanism by means of which the vessel 3 is operated will now be described in detail.

A support 1ª mounted on the casing A carries a combined valve and vessel operating lever 1 which as shown is pivoted at 1ᵇ. On one side of its pivoted mounting said lever 1 carries a weight 5 and on the other side it is connected with the supporting member 2 desirably by a link 4 and engages at its inner end the valve stem 13 of a valve closure 11. Said valve closure 11 coöperates with a valve seat 22 formed in a fitting 23. Said fitting 23 is provided with inlet and outlet chambers 24 and 25, the inlet chamber 24 communicating with a pipe 10 connected with any suitable source of supply and the outlet chamber 25 delivering to pipe 12. Said fitting 23 is mounted at 26 to any suitable stationary part. A stop 37 mounted on any suitable stationary part, and if desired adjustable thereon, may serve to limit downward movement of the vessel 3 by engagement with the lever 2.

A conventional form of coin controlled mechanism is shown for the purpose of controlling the vessel operating lever 1. A pivotally mounted lever 27 is provided having an extension 28 adapted to normally engage the end of the lever 1 and hold the same in the position shown in Fig. 1 of the drawing. Movement of lever 27 is limited in opposite directions by stops 29 and a spring 30, having a very light tension, normally tends to hold the lever in the position shown. 31 designates a coin chute the delivery end of which is normally closed by a pivotally mounted lever 32 provided on one end with a weight 33 adapted to hold said lever in a closing position and having on its other end a hook 34 adapted to engage a pin 35 mounted on lever 27.

The operation is as follows: When the parts are in the position shown in Fig. 1 the outer end 28 of the lever 27 engages the lever 1 and is held in engagement therewith by the hook 34 engaging the pin 35, the lever 27 engaging the right hand stop 29. When the coin strikes the lever 32 the hook 34 releases pin 35 and the weight 5 depresses the lever 1 throwing the lever 27 into engagement with the left hand stop 29 against the action of spring 30 and thereby releasing the lever 1. The weight 5 will overbalance the vessel 3 and raise the same, through the link 4 and arm 2, and thereby open the valve 11 permitting the liquid to discharge through pipe 12 and the open valve 7 into the vessel 3 until the latter with its contained liquid overcomes the weight 5. It will be understood that the weight 5 may be adjusted on the lever 1 in a manner to vary the amount of liquid delivered to the vessel 3. As the vessel 3 descends it acts through lever 2 and link 4 to raise the weight 5 and permit the valve 11 to descend upon its seat. Downward movement of the vessel 3 seats the valve 7 and unseats valve 15 and permits discharge of the liquid through vending pipe 16. It will be noted that valve 11 is also closed when the valve 7 is closed therefore if one of said valves should seat imperfectly and leak the other of said valves would prevent any material leakage or supply of liquid over and above the quantity measured out. After the weight 5 has depressed the lever 1 and the latter has passed out of engagement or below the part 28 the spring 30 will restore lever 27 to the position shown in Fig. 1 so that when the lever 32 is subsequently restored to a closing position the hook 34 will engage the pin 35 as shown. In order to permit the lever 1 to pass the extension 28 on its upward or restoring movement the lever 27 is preferably loosely mounted and the lever 1 is provided with a chamfered or slanting surface as shown in Fig. 4.

I claim:

1. In an apparatus of the class described, the combination, of a movable vessel provided with a valve seat, a filling pipe projecting into said vessel and engaging the same to insure movement in a straight line, said filling pipe being provided with a valve seat, a double valve adapted to alternately coöperate with said valve seats to close the filling pipe or vessel, a pivotally mounted supporting lever, a flexible connection for said supporting member and vessel, a weighted valve operating lever, a link connecting said supporting and valve operating levers, and a valve inlet or supply for said vessel operated by said weighted lever.

2. In an apparatus of the class described, the combination, of a vessel provided with a valve seat, a filling pipe projecting into said vessel and engaging the same to insure movement in a straight line, said filling pipe being provided with a valve seat, a double valve adapted to alternately coöperate with said valve seats to close the filling pipe or vessel, a pivotally mounted supporting lever connected with said vessel, a weighted valve operating lever connected with said supporting lever, and a valve inlet or supply for said vessel operated by said weighted lever.

3. In an apparatus of the class described, the combination, of a vessel provided with a valve seat, a filling pipe projecting into said vessel and engaging the same to insure movement in a straight line, a valve closure for said vessel valve seat, means associated with said closure and filling pipe for unseating the former, a pivotally mounted supporting lever connected with said vessel, a valve operating lever connected with said supporting lever, means for operating said valve lever and therethrough effecting movement of said vessel, and a valve inlet or supply for said vessel actuated by said operating lever.

4. In an apparatus of the class described, the combination of a movable vessel provided with a valve seat, a filling pipe provided with a valve seat, and a double valve coöperating with said seats.

5. In an apparatus of the class described, the combination of a movable vessel provided with a valve seat, a stationary filling pipe projecting into said vessel and serving as a guide therefor, said filling pipe also having a valve seat, and a double valve coöperating with said vessel and pipe seats.

6. In an apparatus of the class described, the combination of a movable vessel provided with a valve seat, a stationary filling pipe projecting into said vessel and engaging the same to guide it, said filling pipe also having a valve seat, and a double valve coöperating with said vessel and pipe seats, the movement of said vessel and the disposition of said double valve being such that the pipe seat acts through the valve to unseat the valve from the vessel seat and vice versa.

In testimony whereof I affix my signature in presence of two witnesses.

ERICK WALDEMAR LINDGREN.

Witnesses:
 HILDUR HÅKANSON,
 HJ. FETTERSTROM.